N. H. DAVIS.
BRAKE HEAD.
APPLICATION FILED JULY 3, 1915.
1,163,742.
Patented Dec. 14, 1915.
2 SHEETS—SHEET 1.
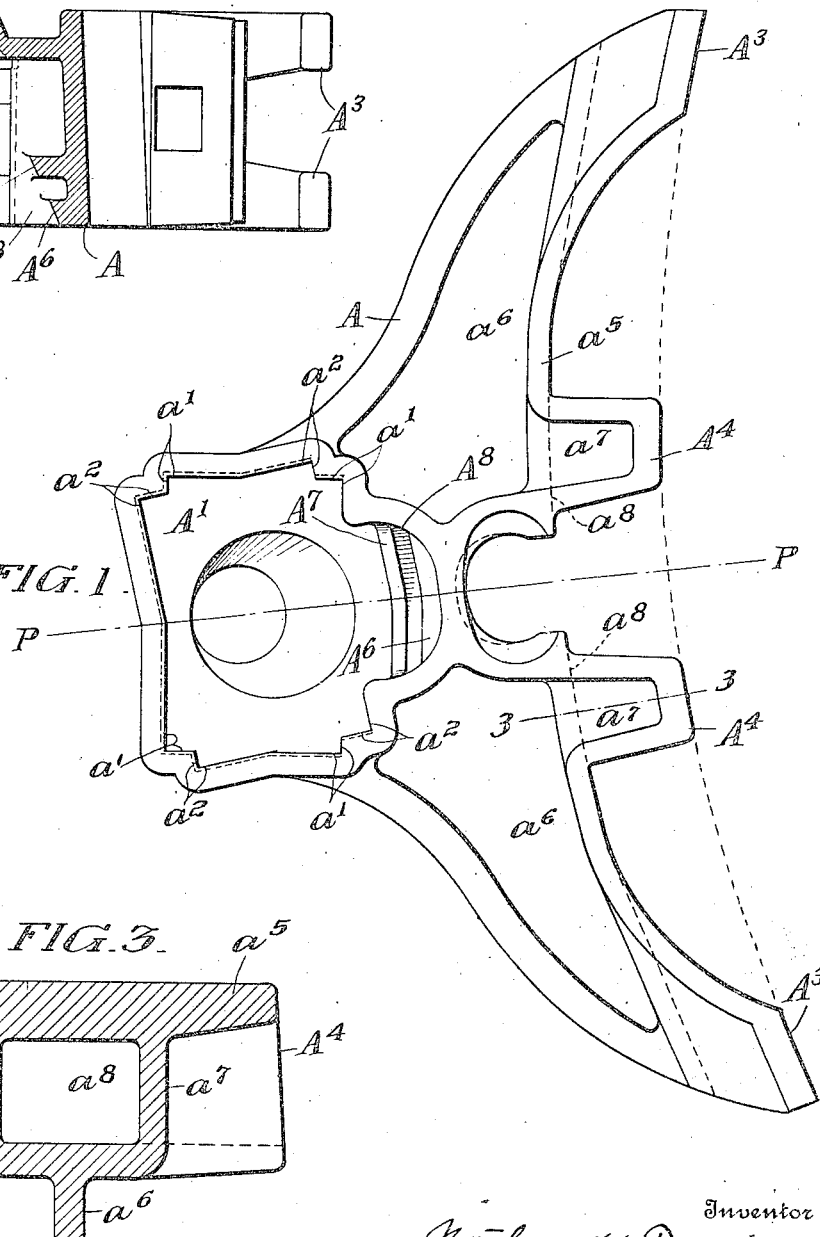
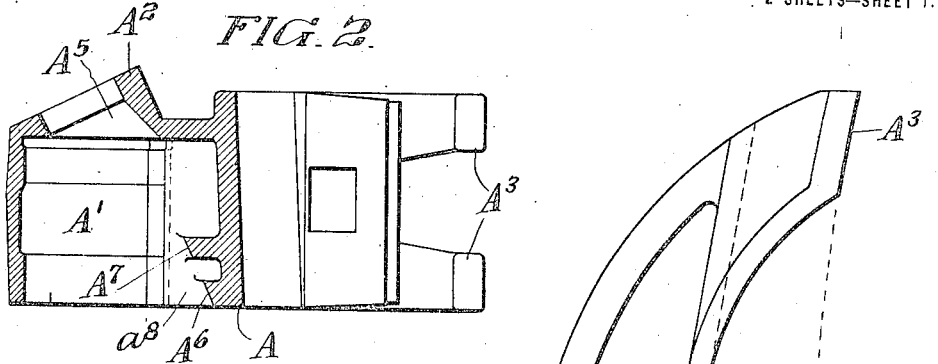
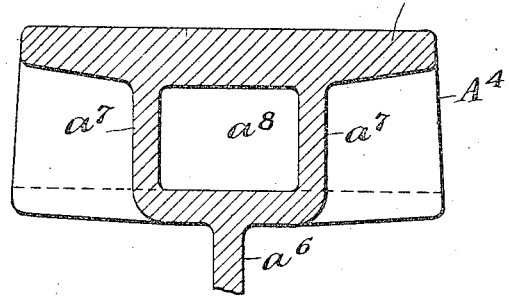
Witness
Daniel Webster, Jr.
Inventor
Nathan H. Davis
By Francis T. Chambers
his Attorney

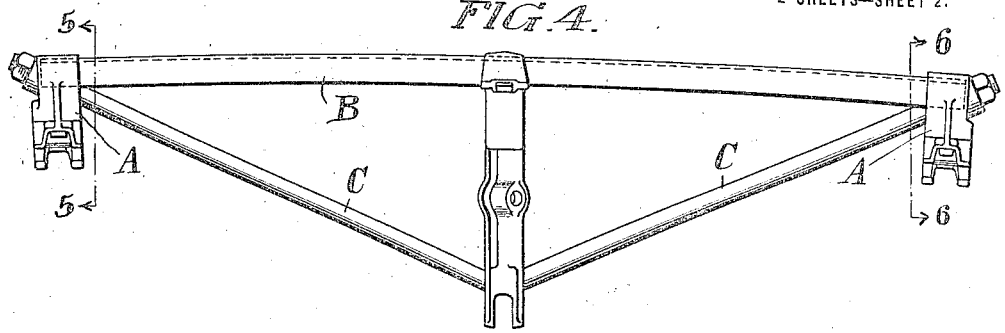
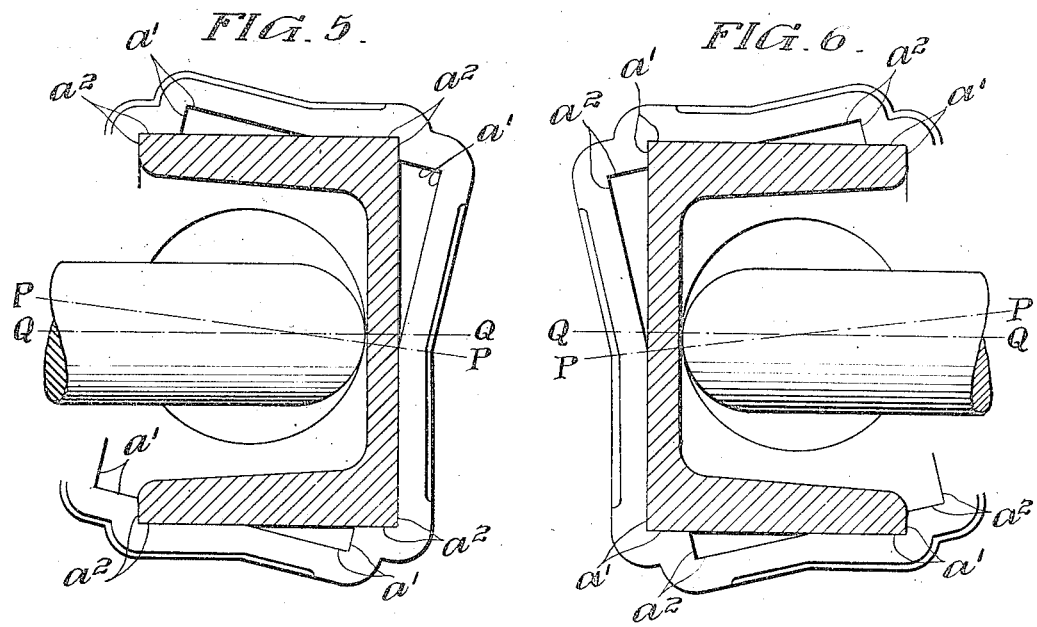
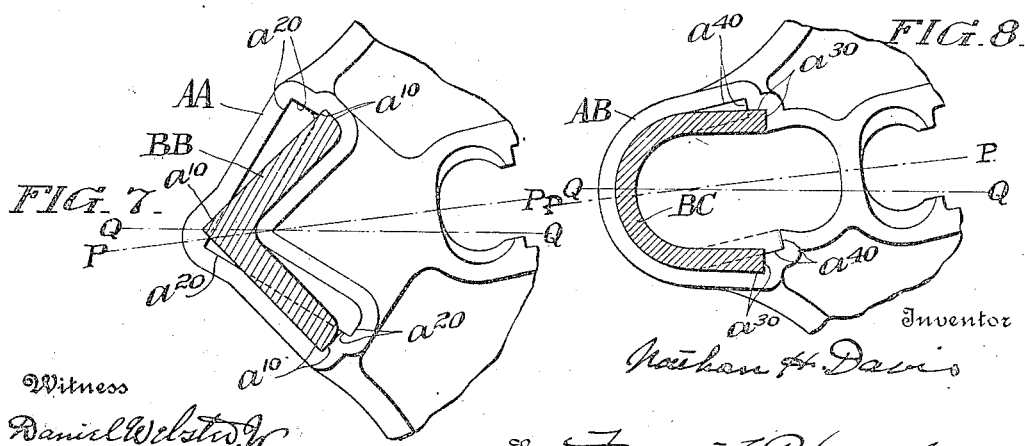

UNITED STATES PATENT OFFICE.

NATHAN H. DAVIS, OF PHILADELPHIA, PENNSYLVANIA.

BRAKE-HEAD.

1,163,742.

Specification of Letters Patent. Patented Dec. 14, 1915.

Application filed July 3, 1915. Serial No. 37,809.

*To all whom it may concern:*

Be it known that I, NATHAN H. DAVIS, a citizen of the United States of America, residing in the city and county of Philadelphia, in the State of Pennsylvania, have invented a certain new and useful Improvement in Brake-Heads, of which the following is a true and exact description, reference being had to the accompanying drawings, which form a part thereof.

My present invention relates to railway brake heads and has for its object to provide a brake head of the closed end type having simple and effective provisions adapting the brake head for use on either end of an ordinary brake beam, thus making it possible for the two brake heads attached to the opposite ends of an ordinary brake beam to be interchangeable counterparts. Heretofore it has not been practically possible to do this with closed end brake heads, *i. e.*, a brake head having a socket to receive the end of the brake beam and into which the brake beam can be inserted at one end only of the socket. The reason for this is, that in ordinary practice, the brake heads are so mounted on a brake beam that the central plane of the brake head makes an appreciable angle with the central plane of the brake beam proper. By the term central plane, I mean, in the case of the brake head, a plane normal to the braking surface of the shoe mounted on the brake head and passing through the center of the brake head; and in the case of the beam, the longitudinal plane which in the case of an ordinary truss beam includes the axes of the tension and compression members of the beam. Moreover, in the ordinary brake beams now in common use, the beam, or the compression member thereof in the case of a truss beam, is ordinarily made out of a rolled bar or beam such as an I beam, or a channel or angle bar, and the ends of the beam on which the brake shoes are mounted are symmetrical with respect to the central plane of the beam. The socket formed in the ordinary brake head to fit over the end of the beam is symmetrical, therefore, with respect to the central plane of the beam, and not with respect to the central plane of the brake head. In consequence, when an ordinary brake head, as heretofore constructed, is turned upside down, as must be done when a closed end brake head is transferred from one end of a brake beam to the other, the inclination of the central plane of the head to the central plane of the beam is reversed.

In accordance with the present invention, I form the brake shoe head with two sets of brake beam engaging surfaces in the socket portion of the head so that there is the same angle between the center plane of the beam and the center plane of the brake head when the latter is mounted on one end of the beam with one set of said surfaces in use, and when mounted on the other end of the brake beam, with the other set of said surfaces in use.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of my invention.

Of the drawings: Figure 1 is a side elevation of a brake head constructed in accordance with my present invention; Fig. 2 is a section on the line P—P of Fig. 1; Fig. 3 is a partial section on the line 3—3 of Fig. 1; Fig. 4 is a plan view of a brake beam provided with heads constructed as shown in Figs. 1 and 2; Fig. 5 is a partial sectional elevation taken on the line 5—5 of Fig. 4; Fig. 6 is a partial section taken on the line 6—6 of Fig. 4; Fig. 7 is a partial side elevation showing a brake head adapted for use on a different type of brake beam from that to which the brake head of Figs. 1 to 6 is attached; and Fig. 8 is a view taken similar to Fig. 7 illustrating the use of the invention in brake heads adapted to still another form of brake beam.

In the drawings and referring first to Figs. 1 to 6 inclusive, A represents a brake head of the so called closed end type, and A' represents the socket in said head to receive the end of the brake beam. A² represents the apertured end wall closing one end of the socket A'. Ordinarily the brake head A will be, as shown, symmetrical at opposite sides of its central plane, indicated in the drawings by the line P—P. The brake head A is formed with the usual brake shoe engaging lugs A³ at the opposite ends of the brake head, and with the lugs A⁴ adjacent the center of the brake head. The brake head shown in Figs. 1 to 6 inclusive is adapted for use on a well known and extensively used type of truss brake beam, shown in Fig. 4, in which the compression member B of the beam is a channel bar. The walls of the socket A' are arranged to form one set of surfaces $a'$ for engagement with one end of the brake beam, (see Figs. 1 and 5); and another set $a^2$ for engagement with the other end of the brake beam, (see Fig. 6). These two surfaces are so shaped that when the head A is mounted on one end of the brake beam with the latter in engagement with the surfaces $a'$ there will be the same angular difference between the central plane of the beam indicated by the line Q—Q and the central plane (P—P) of the head as when the brake head is turned upside down and mounted on the other end of the brake beam with the surfaces $a^2$ engaging the beam. In the symmetrical preferred construction illustrated the surfaces $a'$ and $a^2$ of the brake head A, each comprise the same number of sections, and each section of the surfaces $a'$ is symmetrically disposed with respect to a corresponding similar section of the surfaces $a^2$ at the opposite sides of the center plane P—P.

The aperture $A^5$ in the end wall $A^2$ of the brake head receiving the truss rod C of the beam, is tapered to provide ample space for the truss rod in the different angular relations (see Figs. 5 and 6) of the rod and brake heads on the opposite ends of the beams. For the same reason the notch $A^8$ formed in the wall of the socket A' adjacent the open end of the latter, and the truss rod guiding surfaces $A^6$ and $A^7$ therein are enlarged in a direction transverse to the length of the truss rod.

With brake heads of the general type illustrated, difficulty has been experienced in forming the central brake shoe engaging lugs $A^4$. When these lugs are solid, casting trouble is experienced because of the abrupt change in section of the cast metal at the edges of the lugs. To avoid this I form the lugs $A^3$ by convolutions, so to speak, in the web portion $a^5$ which forms practically all of the face or wall of the brake head adjacent the brake shoe. The portion of the web $a^5$ forming each lug $A^4$ is connected to the transverse central web $a^6$ of the head by the parallel webs $a^7$ which form the side walls of the slot $a^8$ through the lug for the usual brake shoe fastening devices. This construction avoids unnecessary weight and at the same time gives ample strength and the maximum possible bearing surface to the lugs $A^4$, and practically eliminates casting troubles.

The invention is especially well adapted for use with the widely used style of brake beam shown in Figs. 1, 4, 5 and 6 because the rectangular outline of the cross section of the end portion of the beam makes it comparatively easy to provide surfaces $a'$ and $a^2$ which will insure the bearing surfaces ample in size and so disposed as to insure the necessary strength, rigidity and accuracy in assembly. It will be apparent, however, that my present invention may be employed in brake heads adapted for use on brake beams of other types or designs from that shown in Figs. 1 to 6 inclusive, and in Figs. 7 and 8, by way of example, I have illustrated the application of my invention to brake heads adapted for use on two different designs of brake beams. In Fig. 7, the brake head AA is fitted on a brake beam of channel bar section at its ends BB, $a^{10}$ represents the surfaces of the brake head AA engaged by the beam when the head is at one end of the beam, and $a^{20}$ represents the surfaces engaged by the beam when the brake head is on the other end of the beam. In Fig. 8 the brake head AB is shown applied to a brake beam having a compression member BC of U section, $a^{30}$ representing the surfaces of the brake head engaged by the brake beam on one end, and $a^{40}$ the surfaces engaged when on the other end of the brake beam.

While in accordance with the provisions of the statutes I have herein described and illustrated the best forms of my invention now known to me, it will be apparent to those skilled in the art that changes can be made in the form of my invention without departing from its spirit, and that some features of my invention can be used in some cases without a corresponding use of other features of the invention.

Having now described my invention, what I claim as new and desire to secure by Letters Patent, is:

1. A reversible brake head formed with a brake beam receiving socket having two sets of beam engaging surfaces.

2. A reversible closed ended brake head formed with a brake beam receiving socket open at one end of the head and formed with two sets of beam engaging surfaces so relatively arranged that the center plane of the head will make the same angle with the center plane of the beam when the head is mounted on one end of the brake beam with the latter in engagement with one set of surfaces and when the head is mounted on the other end of the beam with the latter engaging the second set of said surfaces.

NATHAN H. DAVIS.